United States Patent [19]
Rozmanith et al.

[11] Patent Number: 5,185,857
[45] Date of Patent: * Feb. 9, 1993

[54] METHOD AND APPARATUS FOR MULTI-OPTIONAL PROCESSING, STORING, TRANSMITTING AND RETRIEVING GRAPHICAL AND TABULAR DATA IN A MOBILE TRANSPORTATION DISTRIBUTABLE AND/OR NETWORKABLE COMMUNICATIONS AND/OR DATA PROCESSING SYSTEM

[76] Inventors: A. Martin Rozmanith; Anthony I. Rozmanith, both of 118 W. Riding Dr., Cherry Hill, N.J. 08003

[*] Notice: The portion of the term of this patent subsequent to Jan. 12, 2010 has been disclaimed.

[21] Appl. No.: 544,826

[22] Filed: Jun. 27, 1990

Related U.S. Application Data

[63] Continuation-in-part of Ser. No. 535,916, Jun. 11, 1990, abandoned, which is a continuation-in-part of Ser. No. 521,714, May 7, 1990, which is a continuation-in-part of Ser. No. 494,115, Mar. 14, 1990, which is a continuation-in-part of Ser. No. 450,606, Dec. 13, 1989.

[51] Int. Cl.⁵ .......................................... G06F 15/20
[52] U.S. Cl. ..................................... 395/148; 395/147
[58] Field of Search ...................... 364/518, 521, 523; 395/153, 154, 155, 161, 147, 148

[56] References Cited

U.S. PATENT DOCUMENTS

| | | | |
|---|---|---|---|
| 4,623,147 | 11/1986 | Ackerman et al. | 273/1 |
| 4,648,036 | 3/1987 | Gallant | 364/300 |
| 4,648,037 | 3/1987 | Valentino | 364/408 |
| 4,723,211 | 2/1988 | Barker et al. | 364/900 X |
| 4,739,477 | 4/1988 | Barker et al. | 364/900 X |
| 4,760,390 | 7/1988 | Maine et al. | 340/747 |
| 4,764,867 | 8/1988 | Hess | 364/200 |
| 4,769,762 | 9/1988 | Tsujido | 364/521 |
| 4,777,485 | 10/1988 | Costello | 340/799 |
| 4,779,080 | 10/1988 | Coughlin et al. | 340/712 |
| 4,949,248 | 8/1990 | Caro | 364/200 |

Primary Examiner—Heather R. Herndon
Attorney, Agent, or Firm—Synnestvedt & Lechner

[57] ABSTRACT

A method and apparatus for rapid search and co-display of graphics and tabular data for both local and distributed computer dsystems on a mobile station. The method rapidly selects and displays related graphical and text information via a Graphical User Interface (GUI) from both a Graphical Relational Database (GRDB) and large tabular database. An operator on a mobile station such as a plane or car enters a query where previously encoded and stored graphics elements are selected, via a control program on a host computer located on the mobile system, from a mass storage device and displayed with related text information on a local display. This method provides intelligent selection and display of graphics data based on an analysis by the system as to what graphics elements or images are required to satisfy the operator query, and how these elements are to be displayed in conjunction with related tabular (text) data.

26 Claims, 13 Drawing Sheets

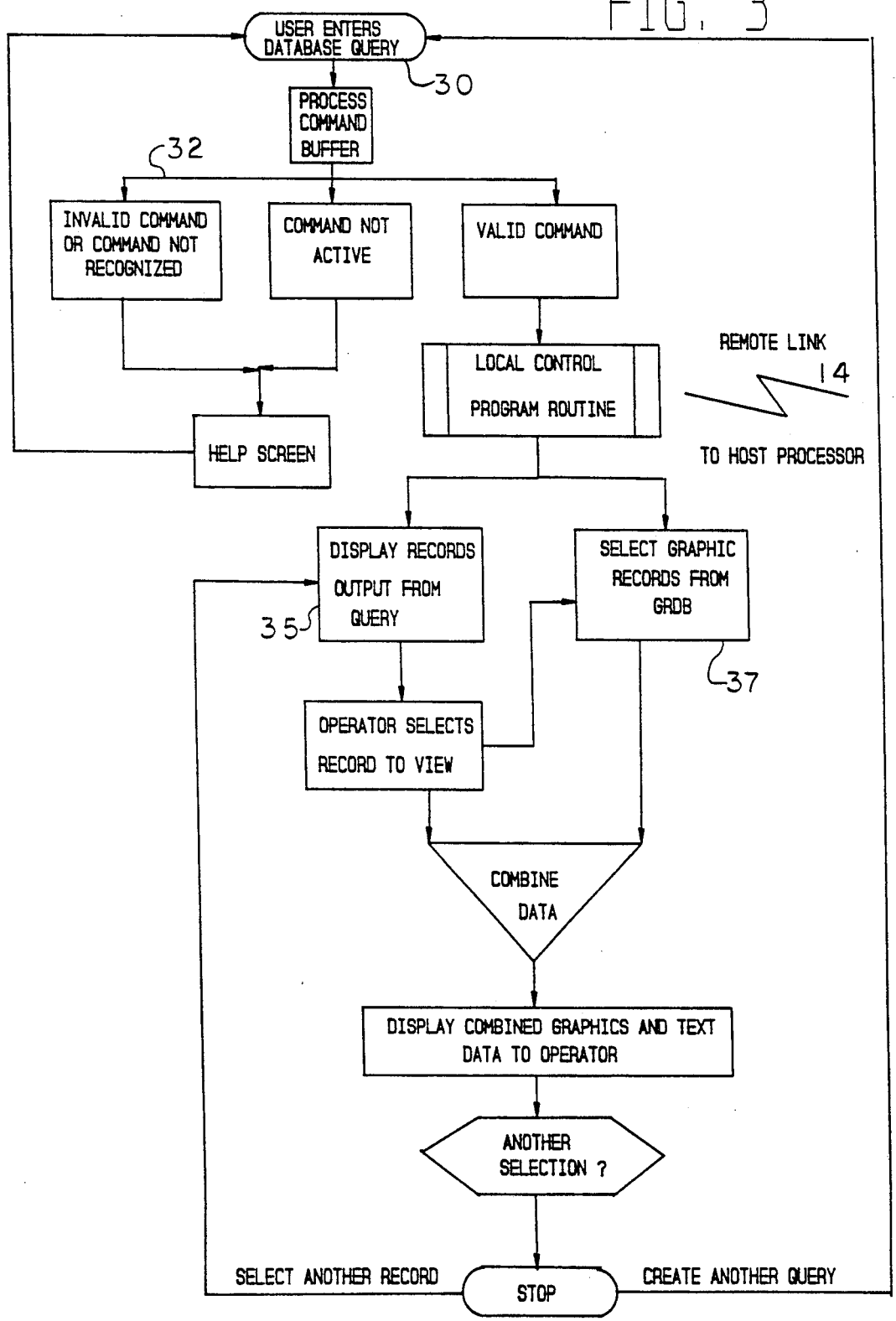

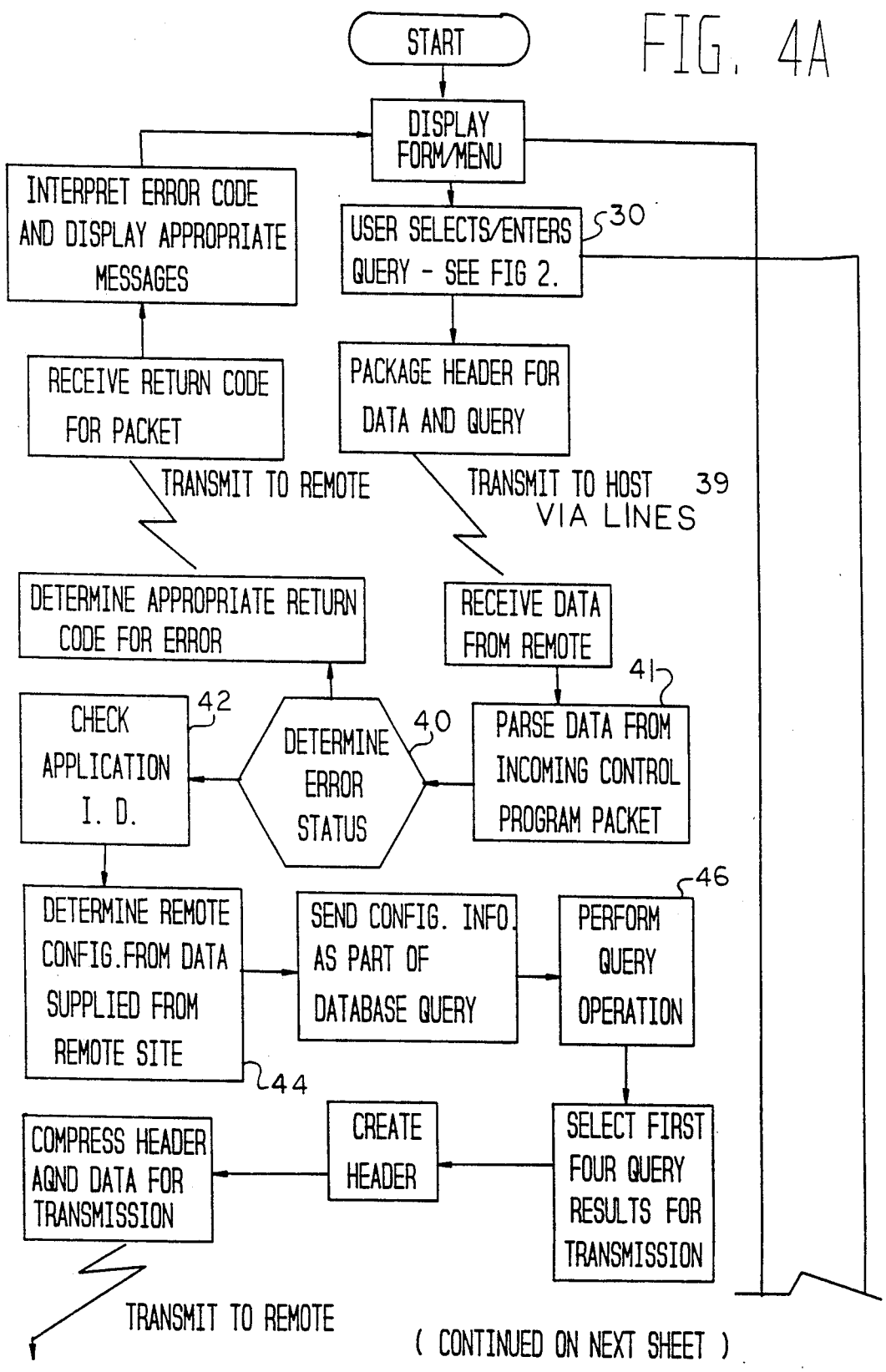
FIG. 4A
(CONTINUED ON NEXT SHEET)

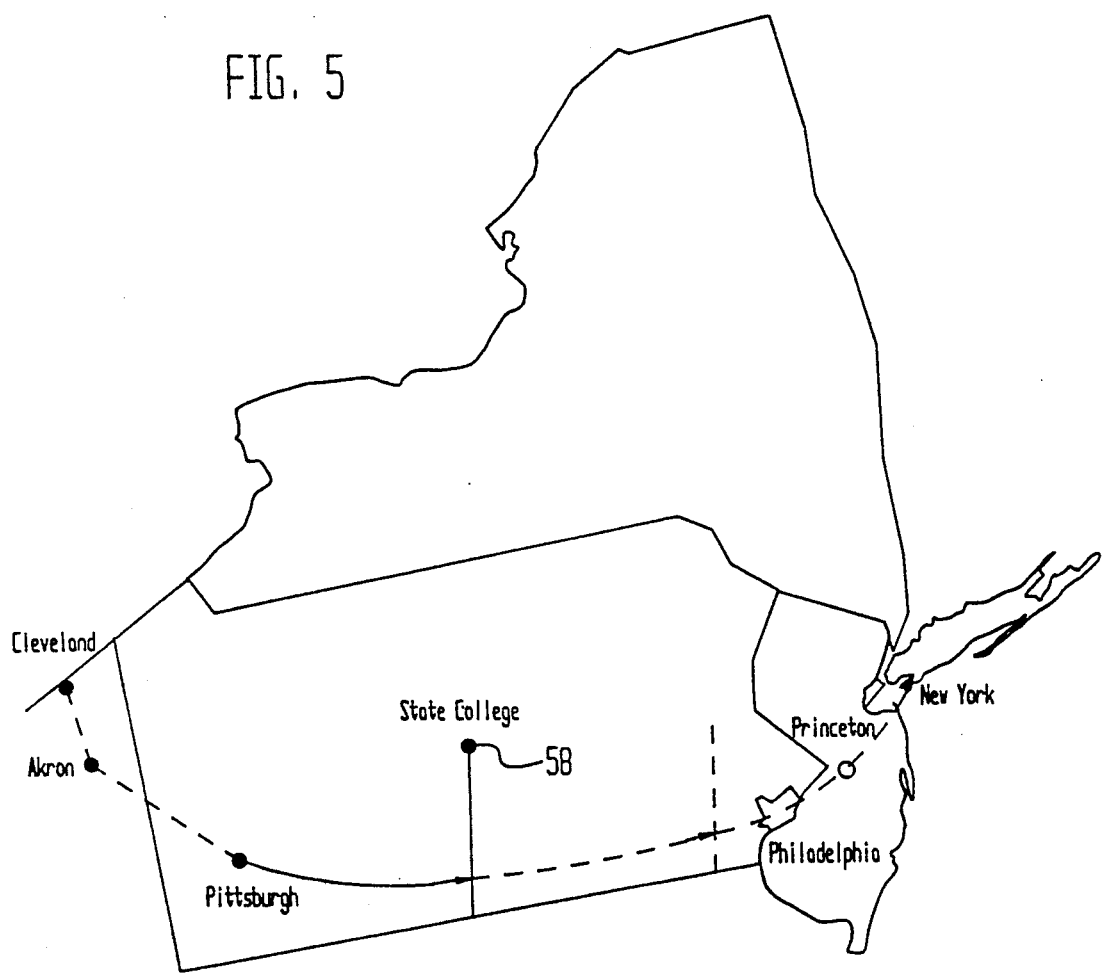

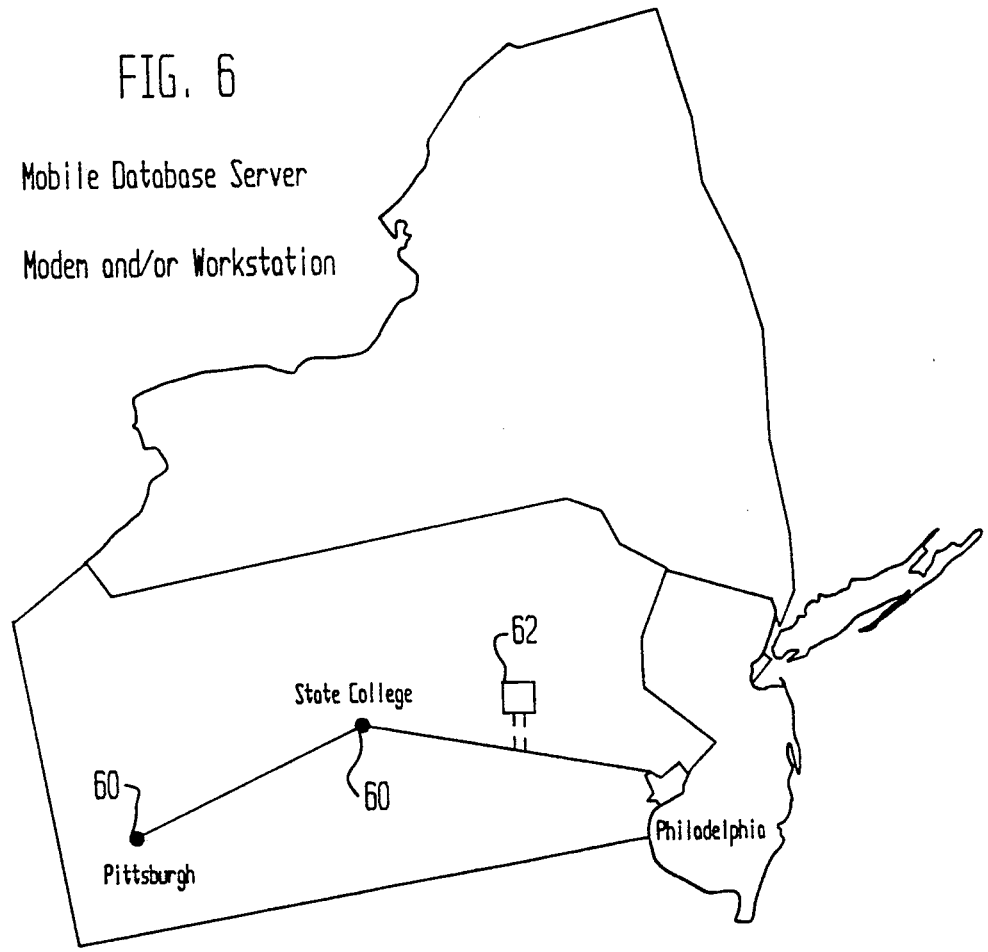

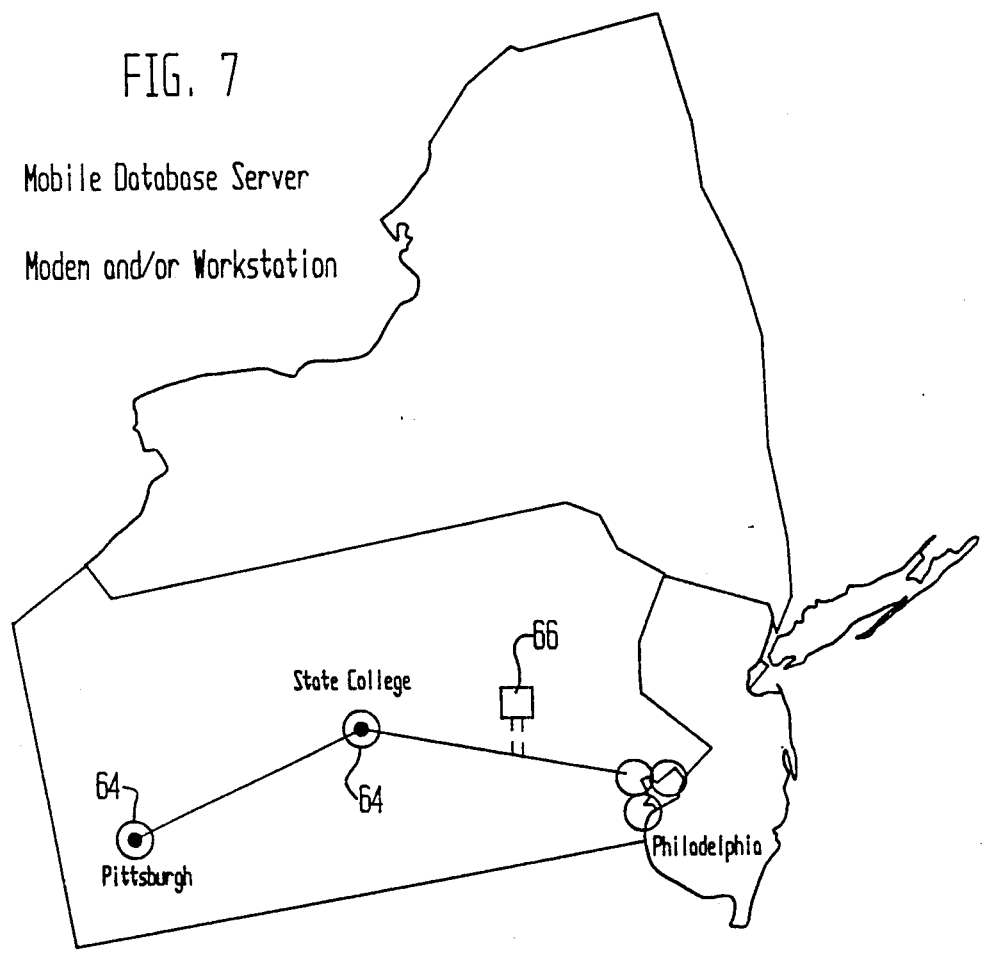

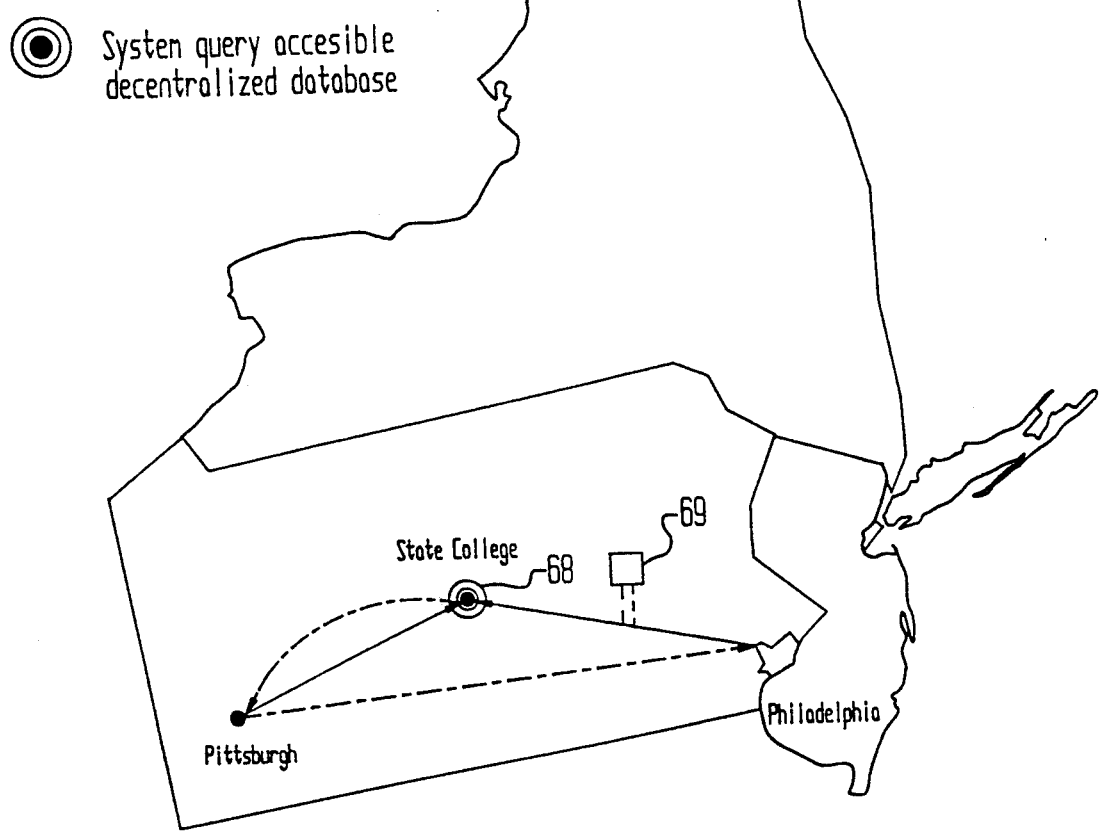

| NODE LOCATION NO. | APPLICATIONS AT NODE | | | TOTAL |
|---|---|---|---|---|
| | ① | ② | ③ | |
| 1 | X | X | X | 3 |
| 2 | X | X | X | 3 |
| 3 | X | X | | 2 |
| 4 | X | | | 1 |
| 5 | X | | X | 2 |
| 6 | X | | X | 2 |
| 7 | X | X | | 2 |
| 8 | X | | | 1 |
| 9 | X | X | | 2 |
| 10 | X | X | | 2 |
| 11 | X | X | X | 3 |
| 12 | X | X | | 2 |

5,185,857

METHOD AND APPARATUS FOR MULTI-OPTIONAL PROCESSING, STORING, TRANSMITTING AND RETRIEVING GRAPHICAL AND TABULAR DATA IN A MOBILE TRANSPORTATION DISTRIBUTABLE AND/OR NETWORKABLE COMMUNICATIONS AND/OR DATA PROCESSING SYSTEM

RELATED APPLICATIONS AND CLAIM OF PRIORITY

This application is a continuation-in-part of co-pending U.S. Ser. No. 535,916, filed Jun. 11, 1990, now abandoned, which is a continuation-in-part of U.S. Ser. No. 521,714 filed May 7, 1990 which is itself a continuation-in-part of U.S. Ser. No. 494,115 filed Mar. 14, 1990 which is itself a continuation-in-part of U.S. Ser. No. 450,606, filed Dec. 13, 1989.

FIELD OF THE INVENTION

The present invention is related in general to mobile interactive local and distributed database processing, storing, transmitting, and/or retrieving systems. The present invention is further directed to mobile graphics and textual information display systems. In particular, the present invention is directed to an improved method and apparatus for providing distributable rapid database search, processing, and/or display of such information in a multi-option, seat specific workstation, preferably combinable into a local or wide area network, and which can be utilized in a mobile updatable and upgradable on-board transportation, data processing and/or information system which is preferably part of a larger information network system also comprising stationary user locations.

BACKGROUND OF THE INVENTION

As recent as five years ago, any notion of replacing a mainframe computer with a PC (personal computer) was impossible. PC's weren't powerful enough. But as PCs have gotten faster and have remained astonishingly cheap, PCs have become able to perform certain functions better than mainframes. The advancement in PCs has reached the point where they can be implemented as part of a distributed mobile database system.

A further technological advancement which has driven the PC market has been the development of the Graphical User Interface (GUIs). Recent studies have concluded that graphical user interfaces GUIs make computers, software and computer-driven devices easier to learn, operate and more productive.

At the same time, conveniently transportable database storage devices such as CD ROM disks and tape storage, each providing capacities in the range of 10 megabytes to over one gigabyte per passenger have become available.

Moreover, the above technological advancements have been coupled with the rise in the use of portable "laptop" computers. These computers have gained wide acceptance by business travelers. Laptop computers have several limitations. Most prominent of these is their limited storage and graphics capabilities. In addition, laptop computers, when used away from an AC power source, must be powered by batteries and require frequent recharging. This has heretofore limited the use of laptop computers, particularly in locations away from AC power.

Further, existing single user, network, or network alternative systems which utilize a PC (or equivalent) and a central host or server connected via conventional telephone lines cannot be practically upgraded to provide efficient GUIs and distributed large volume graphics and/or multi-tasking displays. It was particularly impossible until the creation of PCs with processing powers in the range of 4 to 100 mips to provide for a multi-option distributable and networkable on-board mobile transportation, communication, and/or data processing system.

In addition, the implementation of a practical GRDB (Graphical Relational Database) and a GUI accessible at least in part (e.g. by a substantial portion of users) via a conventional telephone network, relying at least in part on a communication link over existing conventional telephone lines, is presently impractical due to the volume of data and limited data transmission rates. The highest transmission rate currently practical over conventional telephone lines is in the range of 9600 to 19,200 baud. Under the present most widely available modem technology (which transmits at 1200 to 2400 baud over standard telecommunication lines), it requires approximately two minutes to transmit a standard 300 dpi (dots per inch) scan of a photograph. Also, the frequent screen updates required by a GUI would strain this type of data transmission. A potential bottleneck is thus created because the graphics data is not stored on-site, but rather must be transmitted via conventional telephone transmission lines from a remote location.

The PC (personal computer) market has long had a need for a system incorporating graphical data within an optionally distributable and "on demand" updatable database. A graphically oriented user interface for optional at least dual-distributability, interactive seat specific passenger use with on-demand coordination and distribution provided by an interactive on-board mobile host, database and network system would be a major advancement, and would greatly improve the work efficiency of passengers in need of in transit data processing, thus providing them with a considerable advantage over users who do not implement such a system.

In U.S. Ser. Nos. 495,115, 450,606 and 521,714, we disclosed a system for a single user, network and/or network alternative implementation incorporating a GRDB without most limitations posed by conventional telephone transmission lines. The bulk of the locally required data (typically one hundred megabyte to over one gigabyte of graphics data), including pictorial representations (both stationary and animated), and possibly prerecorded tabular, is stored locally and/or provided on transportable database storage means (e.g. disk, tape, etc.) which can be used directly or for upgrading a locally operated and/or networkable single user workstation.

U.S. Ser. Nos. 495,115, 450,606, and 521,714 further disclosed an improved method and apparatus for the rapid search and co-display of graphics and tabular data for both local and distributed computer systems. The apparatus and method of that invention rapidly selected and displayed related graphical and textual information via a Graphical User Interface (GUI) from both a Graphical Relational Database (GRDB) and tabular database. In that invention, an operator entered a query or option request in which previously encoded and stored graphics elements are selected, via a control program, from a local mass storage device and displayed with related textual information on a local display. In alternative embodiments of the invention, the remote host processes a locally generated query which was transmitted back to the local workstation along with data responsive to the query.

In a still further embodiment of the invention of U.S. Ser. Nos. 495,115, 450,606 and 521,714, a local computer processes the query and identifies data responsive to the query. Those query elements which could not be processed locally are processed remotely. In still a further embodiments of that disclosure, the search query could originate from outside the system (via e.g. a phone) and be forwarded to a local workstation to be processed locally such that the graphics and/or tabular data is retrieved from a locally stored database. The local workstation could also interact with at least one LAN (Local Area Network) and/or WAN (Wide Area Network) host/server PC, minicomputer or mainframe computer in processing a response to the query. The system may utilize networked PC's or networked PC alternatives.

It would be desirable to apply the benefits of a distributed database system to an assemblable, updatable, upgradable and transportable mobile database system, which can be utilized by passengers in a comprehensive mobile computer system.

The present invention builds upon the teachings of U.S. Ser. Nos. 495,115, 450,606 and 521,714, by incorporating their teachings relating to a distributable and updatable tabular and/or graphical database and applying them to comprehensive updatable, and upgradable multi-option mobile system(s).

It is an object of the present invention to provide (a) mobile distributed and updatable graphical and/or tabular database.

It is a further object of the present invention to provide an updatable mobile database which can be accessible either in part or in toto depending upon the right to access of a system compatible user.

It is therefore an object of the present invention to provide a system which incorporates a GUI for selecting updatable database options from a host computer located on a mobile station such as a plane, automobile, ship, spaceship or train. In a preferred embodiment, the system provides on-demand service for passengers of common carriers incorporating in the overall system components such as at least one carry-on database means, PC, workstation and/or passenger specific system compatible application software.

It is a further object of the present invention to provide a mobile system which incorporates transmitted data in conjunction with a stored tabular and graphics database, and which can be utilized in the on-board mobile system by the on-board network host and/or workstation.

It is still a further object of the present invention to provide a system in which an on-board host computer processes a query from an on-board passenger specific computer system or workstation, transmits tabular data to the on-board computer or workstation, which then selects associated graphical (and/or tabular) data from a seat restricted GRDB stored on board.

It is another object of the present invention to provide for seat restricted mode operation of a workstation utilizing the combination in part of a permanent on-board distributable and a seat specific computer system.

It is still a further object of the present invention to provide a mobile system which can be updated and upgraded from regionally fixed computer systems.

It is still yet a further object of the present invention to provide a system in which a mobile host computer processes a query from an on-board remote computer system, transmits an address command to the on-board remote computer system, which then selects both tabular and graphical data from a remote database accessible via broad band or satellite communications which is responsive to the address command.

It is still a further object of the present invention to provide a mobile distributed computer system in which various levels of access to the system can be provided to various users of the system.

It is yet a further object of the present invention to provide a mobile distributed database system which can be utilized in local, wide and regional area networks.

It is still a further object of the present invention to provide a system in which the mobile presentation formats are compatible with other on demand compatible networked or networkable presentation elements, database means and/or devices of the system (e.g. a system located in remote convention centers).

SUMMARY OF THE INVENTION

The present invention is direct to an improved multi-optional distributed mobile computer system including passenger selection of seat specific imaging and/or presentation system options. The system further combines a graphical user interface having at least several seat specific operation options, separately addressable databases, preferably which are also processable at the passenger's option by the on-board host.

The system includes large tabular and/or graphic databases and at least one PC host and/or server with a rapid, combined system search and display capability for selected and data from at least two databases (i.e. at least one seat specific and at least one host or server distributed). Output generated by a seat to host query, search and display request is processed by the host and is displayed on a linkable and/or linked end-user, device, terminal or microcomputer such as a personal computer (PC) situated on a train, phone or car. A passenger has the option of inserting a portable PC (e.g. laptop), PC or to merely use a portable database in conjunction with a rented PC.

In accordance with the present invention, apparatus for storing and retrieving graphical and tabular data in a mobile system comprising on-board computer means having CRT and/or other display, such as liquid crystal display and storing a program containing a plurality of presentation options, said mobile computer further containing a graphical user interface program; presentation selection means in communication with said program containing said presentation options for selecting an operation and/or particular option to be transmitted to host computer means located on-board the mobile system; means for transmitting said selected option to said host computer means, said host computer means containing a control program which selects a graphical relational database and tabular database command which matches said selected presentation option, said host computer means transmitting said database command to said mobile on-board computer means wherein said command is displayed on said CRT or other display means by said graphical user interface; and graphical relational database means for storing graphical data and for transmitting graphical data responsive to said command directly to said CRT or other display means in response to a second command from said graphical user interface program.

The mobile system of the present invention provides for linkability and/or updatability and/or upgradability from remote ground stations via broad band radio, microwave or satellite communications systems.

The present invention further provides for the creation of pre-formulated query answers which may be pre-qenerated and pre-stored in the database of the mobile host computer system.

The present invention still further provides for system compatibility between network system components in a distributed network operating option and/or for parallel processability of host accessible database data and/or independent operability under seat specific conditions.

DESCRIPTION OF THE DRAWINGS

FIG. 3 is a flow chart of the presentation selection system of the preferred embodiment.

FIGS. 4A and 4B are an algorithmic flow chart which sets forth the steps utilized by the local or host control program of the preferred embodiment.

FIGS. 5-8 illustrate mobile updatable and upgradable database systems applicable in the United States between various locations.

DETAILED DESCRIPTION OF THE INVENTION

Figure 1:
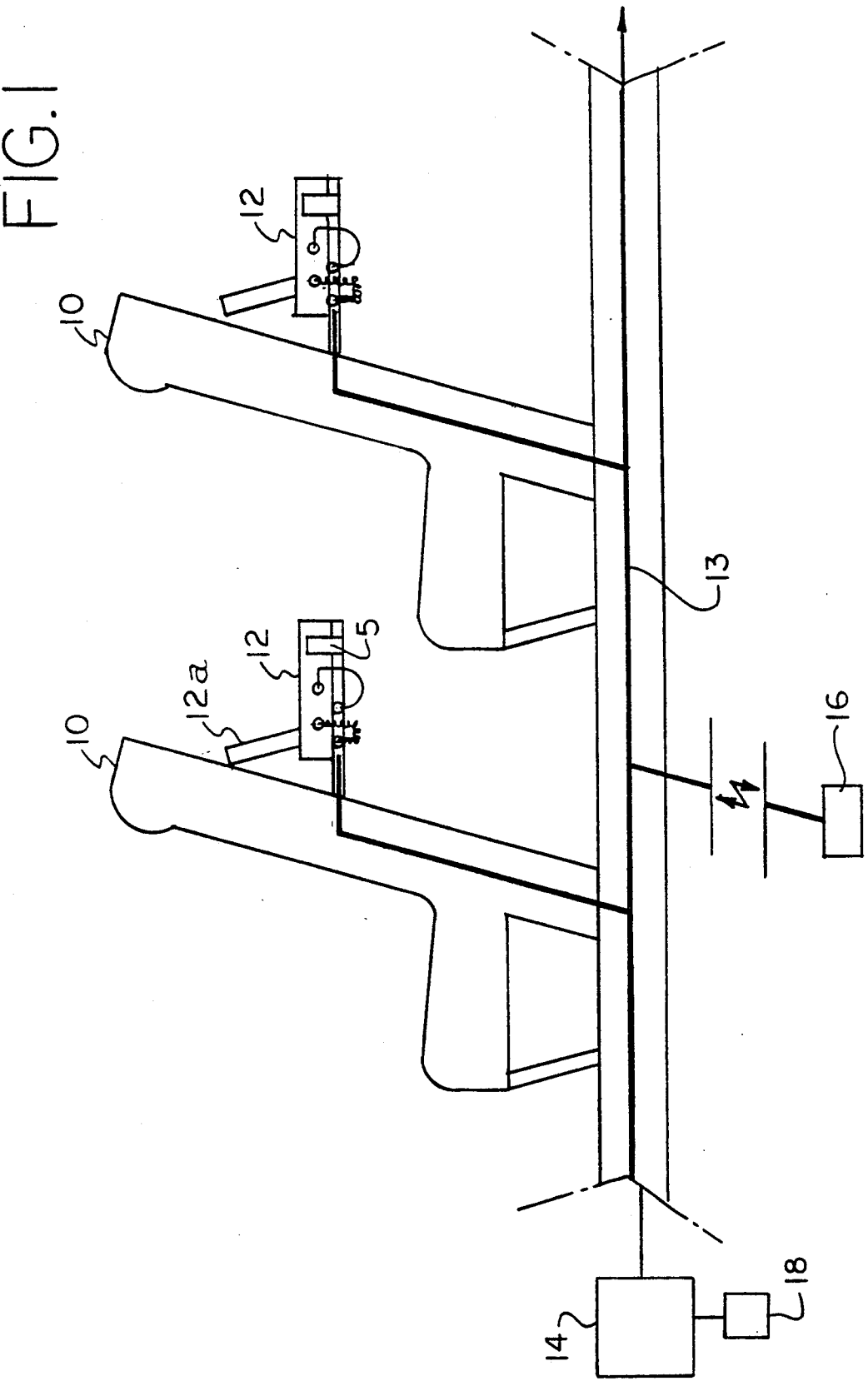
FIG. 1 is a mobile distributed and graphical database system for use in an airplane.

The present invention is described with reference to the enclosed Figures wherein the same numbers are utilized where applicable. FIG. 1 illustrates a section view of an airplane based distributed computerized graphical and tabular information system with a database. As shown the system comprises a plurality of airplane seats 10, such as those found on a commercial airliner, each having associated computer workstations 12. The system includes and utilizes a central host computer 14, which will be stored on-board, and which contains a large, expandable, replaceable and updatable database, a central processing unit and a control program for processing database queries from workstations 12 situated throughout the plane. The local stations 12 are connected to the host through an Ethernet or equivalent network. The Ethernet thus provides for networking between the workstations 12 of the system.

The on-board host computer 14 will typically comprise a computer system such as a COMPAQ System Pro preferably operating under the UNIX operating system and having a memory device with a storage capacity of greater than ten gigabytes. Local workstations 12 either may be segregated in a section or dispersed throughout the plane and will comprise, preferably laptop PC's, notebook PC's, or PC's hooked up to the central on-board host computer 14. The system may also include enhanced monitor additions for hooked-up PC's.

The system will further include communications apparatus such as broad band, satellite and/or other telecommunications modems 16 between the plane and ground and/or other mobile databases. The seat situated on-board display devices may further comprise a terminal emulator 12 such as the EM 320, 4010 and 4105 terminal emulators manufactured by Diversified Computer Systems, Inc.

The individual workstations 12 will include a keyboard and mouse (optional) (not shown) which the passenger may use to enter information into the system. Optionally, keyboards and/or may be provided to the passenger. The seat located system may further include a small printer (not shown) to provide hard copy output of information selected by the passenger. Alternatively, hard copy can be provided, preferably with enhanced color options, at a peripheral station located on the plane 21 which will be accessible by entering a station security number and/or password code.

The on-board host computer 14 is used in association with a mass storage system device such as a WORM (Write Once Read Many) drive 18 which stores encoded Graphics Relational Database GRDB records. WORM (Write Once Read Many) 18 is used in the present embodiment of the invention as the mass storage device for the GRDB by the host computer. For the purposes of this disclosure, the term graphics refers exclusively to pictorial representations such as a raster image. WORM 18 is a large transparent mass storage device which supports random access to data stored on the device and can be updated and upgraded. Worm 18 can also store tabular data. In addition to the example quoted, the present invention can utilize any magnetic, optical, CD, or magneto-optical and/or plasma etched mass storage means or system as a large database. The memory storage devices can also include other devices such as memory cards which are used in laptop and/or pocket PCs. The on-board mass storage device 16 may also comprise an optical tape storage system such as that manufactured by Creo products. One square millimeter of etched optical tape can store 100,000 bits of information.

The interface from the local seat computer or workstation to the WORM 18 is preferably an SCSI (Small Computer Serial Interface) interface (not shown), which is controlled by an intelligent interface attached to the computer bus within the host. The SCSI controller in a multitasking environment (UNIX, OS/2 or others) (UNIX is the preferred operating system of the present invention) will search WORM 18 for data independent of the computer CPU, thereby facilitating very rapid data access. Creation of the WORM for distribution to end users and for updates of the GRDB, allows optimized placement of data on the WORM so as to further speed and access to the data in daily operation of the system. The SCSI interface supports a high data transfer rate of at least twice that of the "standard" ST506 interface used in typical fixed disk and other computer peripherals. It is to be noted other interface controllers could be used in accordance with the present invention. Data brought onto the plane by a passenger on a passenger specific portable database storage means, such as CD ROM disk, tape etc. and loaded into the database storage device of an on-board host computer can also be used in combination with a networked query entering means, such as a terminal or a diskless networked workstation.

It is an essential element of the present invention that the on-board network and host be accessible by terminals, laptops and/or other PC's running under different operating systems. The seat located laptop, notebook PC, or PC 12 may store applications software and temporary work files data. Such data may be part of an on-board database and/or provided as a time limited partial database update, preferably by mail and/or carried on. The host computer system may also incorporate additional co-processors and/or parallel processors.

In order to operate the system of FIG. 1, the passenger initially turns on the laptop, notebook PC, or PC unit 12. Alternatively, the passenger could bring his own laptop onto the plan and hook it up at one of a plurality of workstation jacks provided throughout the plane. The microprocessor in the passenger's workstation system unit 12 is preferably an Intel 80286, Intel 80386 and/or Motorola 68020, 68030 based or higher powered PC workstation. The microprocessor performs the initial program load function which tests the processor hardware and loads the operating system and graphical user interface (GUI) into memory. Alternatively, workstations having increased search display speed needs but still using the operating system and GUI capabilities could also use 386/486 or 68030/68040 based low end workstations with or without additional co-processors (e.g. RISC and/or SLCMP technology).

Windows (preferably including expansions and/or upgrades) is a preferred GUI in the present system because it is the most widely accepted graphical user interface. Windows will be loaded into local workstation. However, other comparable GUI programs are equally applicable in the present invention. Examples of other currently available GUI's are OS/2 PM (Presentation Manager), PM/X, CXI, Motif, and Open Look.

The passenger selects applications (e.g. graphic real estate, medical imaging, architectural designs) from a menu using either a keyboard 11 or, alternatively, a pointing device such as a mouse.

In operation, a passenger would either select a presentation option from the menu of applications, or, alternatively, the presentation system could be configured to load automatically by the system after the power is activated. Referring to the flow chart of FIG. 3, the general organization of the presentation system process is illustrated. The presentation system is controlled by a local control program located on or loadable into the laptop, PC or notebook PC. Initially, the passenger enters a database query 30, selecting options from either menu(s) or by entering data on a command line. Depending upon the particular application, the query consists of one or more search criteria or options which will be processed by the on-board host computer. Alternately, a passenger can also opt to use a rented workstation 12 located throughout the plane combined at least in part with his portable database means (e.g. CD ROM or other optical disk and/or tape) or using a pre-ordered segment of the system database provided on a time limited basis to the eraseable database storage means of the mobile system used. In either situation, the system will be configured to provide various levels of access to the host depending upon the subscription and confidentiality needs of the end user.

With the advent of portable mass storage, such as CD ROM technology, a passenger can carry up to about 600 Megabytes of data on one or two disks in a jacket pocket. These data can be integrated with the combined system and portable database as part of a wide area network (WAN) which can be utilized by the passenger. A WAN supports the "attachment" of an individual's database through the Control Program. The passenger will utilize a CD ROM database, and access the network for an update of information or to access additional database(s). The control program accesses the local network host, performs the data selection and transmits the requested data to the passenger.

The presentation system, residing in the seat situated workstation initially determines whether the query is valid 32. If valid, the query is transmitted to a remote control program residing on the host computer 14. When the processed query is transmitted back from the host computer 14, the passenger has the option of displaying records output from the query 35 or selecting graphic records from the GRDB 37. Depending upon the operating system of the local computer, the local control program can concurrently perform display of selected records, retrieve graphic information from the local GRDB as well as send and receive information from the host 14. This multitasking feature is available under UNIX, Xenix, OS/2, and in DOS versions of the system.

Figure 4B:
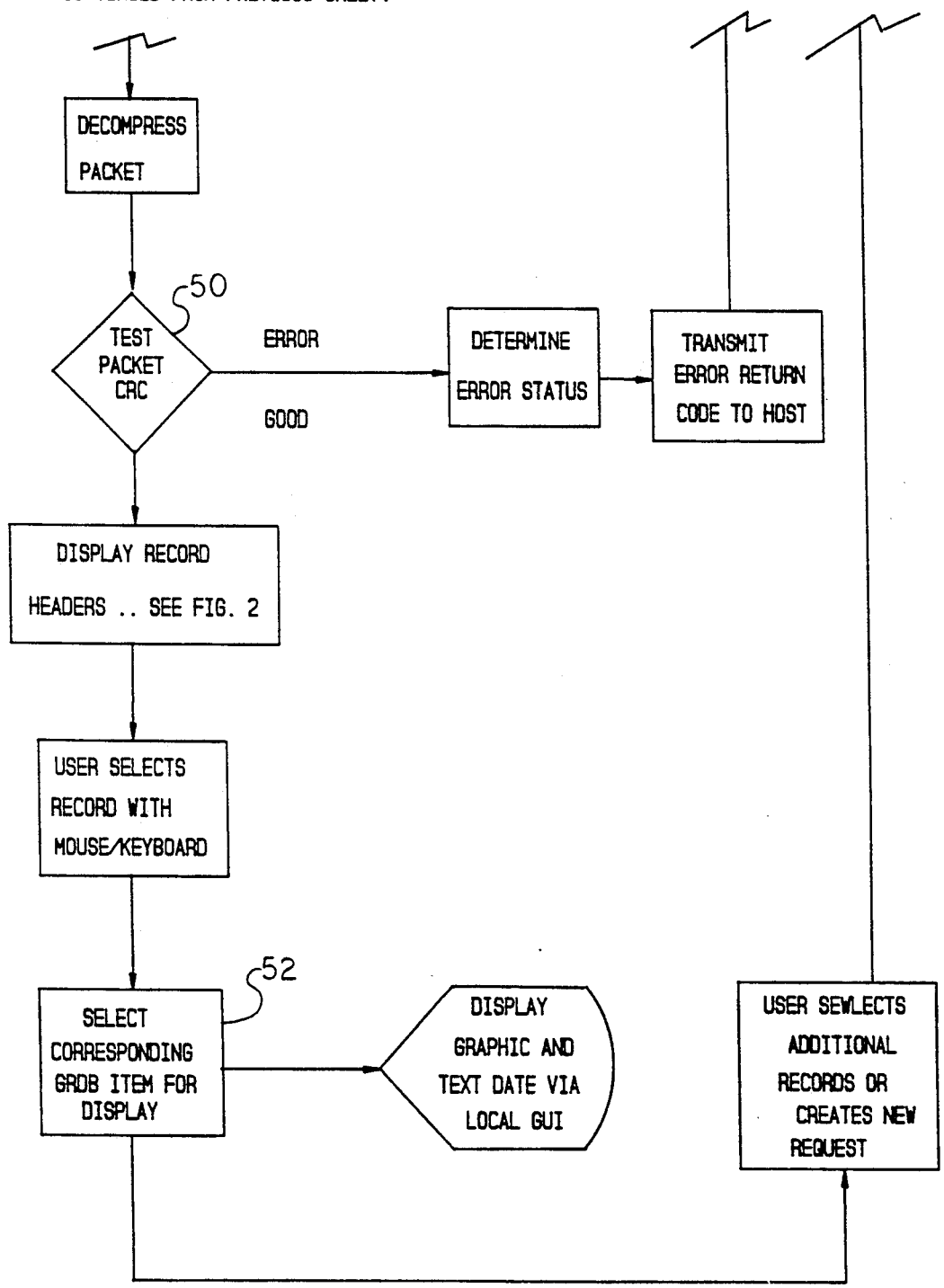

The operation of both the seat located and host control programs are more fully detailed in the algorithmic flow charts of FIGS. 4A and 4B. These flow charts detail the inter-relationship of the seat located and host control programs, and specifically how both test the integrity of data after transmission, parse data, test and process error conditions, and process the database queries.

As shown in the flow chart of FIGS. 4A and 4B, the passenger initially selects or enters a query 30. This process is discussed above with reference to the discussion of FIG. 3. The program at the passenger seat generates header information which includes the configuration of the seat held (e.g. location and passenger specific) computer. The header and query are transmitted as a packet to the host 14 via transmission lines 39. It is to be appreciated that while the present invention will be described in the context of a system utilizing a compressed command language, it is to be appreciated that the present invention can be utilized with noncompressed control program packages. In addition, it is to be further noted by those skilled in the art that several compressed command communications languages and related devices components are commercially available.

Upon receipt, the data is, if compressed, decompressed, parsed by the on-board host 41, and checked for errors 40. The present invention incorporates a cyclical redundancy check (CRC) to determine if there were errors during transmission. If there were errors during transmission, an error status signal is generated 40 and the packet is returned to the seat computer via transmission lines 39. If there were no errors during transmission, the host control program determines the Application ID 42 and the configuration of the seat computer 44 which transmitted the data. This enables the on-board host to format the ultimate command so as to be compatible with the seat mounted system. In operation (e.g. transmit) the host computer 14 can utilize any suitable software such as SCO Xenix or Open Desktop software or any hardware and/or software package providing necessary options and commands for all end users on the mobile system. The Application ID distinguishes the particular device, site and application which will use the data sent in the packet (e.g. GLS a graphic-listing service for real estate, architectural designs or medical diagnostics and/or imaging duties).

The on-board host 14 then processes the query 46, thereby identifying a plurality of data files responsive to the query criteria. The host then selects a preset number of selected files for transmission 48. In the preferred case, the preset number is four. However, it must be stressed that this number may be varied widely according to application, as well as the needs and discretion of the passenger. The selected data is then transmitted back to the passenger's computer system. As with the host program, the local program on the seat located laptop or notebook PC similarly checks for transmission errors 50. If there are no transmission errors, the selected files may be displayed and the user may select corresponding GRDB data 52 from WORM 14. The user also has the option of requesting the transmission of additional files 54, assuming that the total number of files identified by the host upon execution of the query exceeded the preset number.

The following is a detailed listing of the control program packet specifications of an embodiment of the present invention which is included for the benefit of those skilled in the art.

| General Packet Format | |
|---|---|
| STX (start-of-text) | (1 to 4 bytes) |
| Packet Size in Bytes | (16-Bit Binary Numeric) |
| Sequence Number | (16-Bit Binary Numeric) |
| Record Type | (16 Bit binary) |
| Packet Data | (variable size) |
| Checksum Byte | (1 byte) |
| ETX (end-of-text) | (1 to 4 8-bit Bytes) |

PACKET SIZE IN BYTES—is the length in bytes of the Control Packet. It includes the Sequence Number, Record Type, and Packet Data.

SEQUENCE NUMBER—ensures the integrity of the Communications Line. A host system may send a SYNCHRONIZED message (Sequence Number 0) at any time. The message following the SYNCHRONIZED message must start with a 1 and be incremented with a 1 for each transmission.

RECORD TYPE—indicates the type of message being sent. There may be more information in the Data Packet, or the Record Type may be used alone.

PACKET DATA—contains actual data (hardware and graphics configuration information for end user workstation, encryption key, number of records matching query, index for GRDB and (up to) four database records selected by end user database query) being sent in the Packet. These files may or may not be present depending on the Record Type.

CHECKSUM BYTE—the sum of all the bytes of the Protocol Packet, including the data but not the checksum byte (nor the STX/ETX). Subtract the sum, and mask off everything but the lower 8 bits. The result is the checksum byte for the packet.

The operation of the system is more fully explained in the context of the following example which highlights the use of the system by a passenger in the real estate industry in a Real Estate GLS (Graphical-Listing Service) application. In this application, the passenger attempts to accumulate and intelligently evaluate identifications of housing units which satisfy one or more search criteria or options such as price, size and location.

At the time the passenger books his flight, he would reserve database options for his anticipated on-flight search needs. These options may be shipped by overnight carrier and loaded into the central database associated with the central host computer 14 on his flight. The database options may further be varied according to the subscription and confidentiality need of the passenger. In the present example, the passenger would request real estate options, for example. Upon boarding, the passenger would be assigned to one of the seats 10 having a local terminal, or alternatively, the passenger could connect his own laptop or notebook PC to an available open connection located on the phone.

Initially, after booting up his system from the seat, the passenger in this example selects a real estate listing application from a menu on the display 10 associated with his laptop. The passenger can opt to use the on-board (LAN), his carry-on, a pre-ordered and/or network system search based compatible database or any combination thereof. Alternative applications could include medical imaging/engineering applications and architectural designs. The passenger may be presented with a fill-in-the-blank configuration on his screen in which to enter search criteria, such as price range, house type, etc. Each space on the form may alternatively have a pop-up window with a set of choices. Alternatively, the passenger may enter this information using the keyboard.

A control program generates a query 30 from the information on the form, and as described in FIG. 3, generates header information. The laptop or notebook PC then transmits the header and query to the host. This header includes the configuration of the seat unit (e.g. 80286 and/or 80386 with EGA, VGA, SVGA or other graphics), the application used (Real Estate Graphic Listing Service in this example), serial number of the site (used for security by the host) and the operating system (PC-DOS, UNIX, OS/2 or others).

After checking for errors, the central host computer 14 receives the incoming packet and reads the data. The format of the information is preprogrammed in the host. The on-board host parses the data 41 to determine the origin of the data, the configuration limitations of the specific seat site, the application being used, and the data for the application.

The on-board host 14 then processes the database query 46, tabulates the output, and generates a preferably compressed packet to be returned to the passenger. The packet returning to the local site contains the Host ID, Application ID, the number of records successfully retrieved, and address pointers from the (up to) the first four records retrieved to the local GRDB graphic records.

The laptop or notebook PC 12 receives the preferably compressed, packet from the host, parses the data, and displays the first several fields of the four records retrieved from the database on the screen. Database records matching the operator's query may be displayed as tabular output. The passenger has the option of selecting a specific graphical record to view from WORM, or entering another query using either the keyboard or mouse. The WORM dumps the graphic files directly to display device 10 thus bypassing any local processor. The graphics searched within the database will typically be loaded into the system and updated by digitizing a photograph or other graphical output by means of a high resolution optical scanner. The seat user can then select any of the records and fully display them on the screen. For the GLS example, these records would preferably include relevant real estate information such as listing price, details of the house for sale, utilities and tax information as well as at least one monochrome, color still and or moving pictures of the listing, a floor plan and a local map (if available). Using programs such as Hydra by Nth Graphics, Ltd., the system can create walk throughs and flybys which can be stored for real time presentation.

The passenger can then view another record, request additional records from the original query to be retrieved from the host, or create a new request using the original form as set forth in FIGS. 4A and 4B. Advantageously, special query combinations can be host preprocessed for database packaging (including real time color aminated graphics) and local database updating ahead of scheduled presentations and pre-stored on the WORM 18.

It is to be noted that the present system may also facilitate processing between the plane and the ground via an on-board satellite or telecommunications modem 16. Thus, should the passenger request files or processing which cannot be accomplished on-board the plane, the query can be transmitted to a regional center(s), preferably containing a more powerful host computer and/or means for a rapid searchable system database accessible via a broad band or satellite telecommunications modem. Compressed data can then be transmitted to the plane while in flight from a mobile modem linkable system node contact. For example, as shown in FIG. 5, a passenger in transit from Cleveland to New York via Akron and Pittsburgh, may have need to obtain data located on a larger server 58 in State College, PA. In such a case, the query can be transmitted via broad band, or satellite communication link 16. Alternatively, as shown in FIG. 6, local ground based workstations 60 could access a plane based mobile regional host 62. Referring to FIG. 7, the ground based systems can be a second regional host 64, accessible from either the ground or air 66. Finally, FIG. 8 illustrates a configuration in which preprocessed queries may be processed by a decentralized database 68 or accessed from a mobile plane based system.

Figure 10:
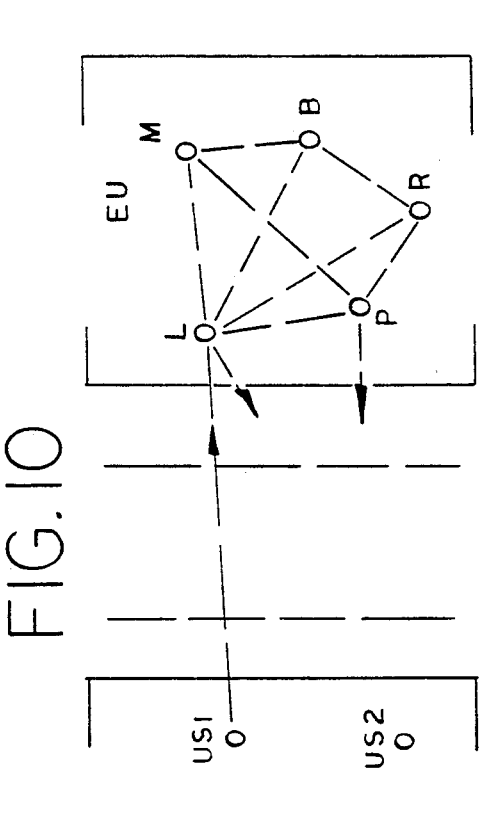
FIGS. 9-12 illustrate worldwide updatable and upgradable systems in accordance with the present invention.
Figure 12:
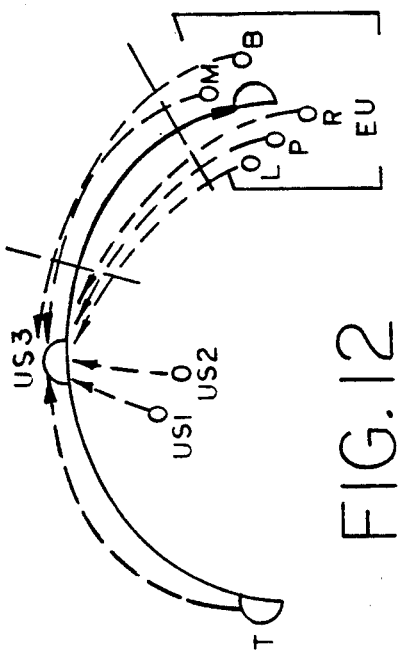
Figure 9:
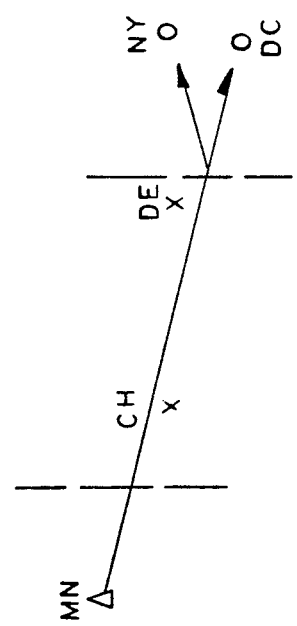
Figure 11:
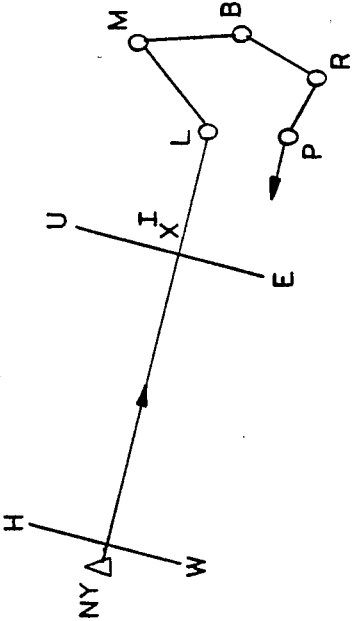

Referring to FIGS. 9-12, the mobile system of the present invention can be utilized as a component of a national interlinked database system (e.g. an interconnected system including Minneapolis and New York as shown in FIG. 9). As shown in FIGS. 10 and 11, distributed processing can be carried out between a jet in transit between New York and Europe and processing/communication centers in London, Moscow, Budapest, Rome and Paris linked by broad band or satellite telecommunications. Finally, FIG. 12 illustrates a global network linking Europe, the United States and the Far East.

It is to be noted that the implementation of the present invention preferably could also incorporate a custom developed raster/vector/attribute graphic database (RVAD) used to obtain specific selection sets which are passed to the standard application. It should be noted that this type of implementation has applicability to other fields such as facilities management, inventory control, material and/or medical diagnostics, and when using multi-layers of superimposed RVAD windows in 3D and/or 4D, volume visualization. A 4D visualization refers to an additional related attribute mapping made possible by RVAD.

RVAD is a method of overlaying a raster image, such as a map, visible to a person viewing a computer screen, over a vector space (part of which is the screen viewed by the local user). The vectors may be displayed or may also be transparent. The vector space is virtual, and the raster image is a "window" looking at a portion of the vector space which is composed of four elements; points, lines, faces, and attributes. Points have one dimension, lines have two dimensions and faces are three dimensional. Attributes do not have a dimension, but for the purpose of the present disclosure, comprise additional database items associated with points, lines, and faces. Each point, line, or face in the vector space can have multiple associated attributes.

A passenger would select either vector points, lines or faces from the raster overlay on the vector space, such as a map on the screen. In other words, the user selects a portion of the raster image with transparent vector components becoming part of the selection set. The vector space is preferably bit or overlay mapped in order to provide background images as shown in FIG. 7C. The selection may be an area, individual object, or a point on the screen. The area may be selected by clicking on a point, or "boxing" an area on the screen with a pointing device (mouse or digitizer) or the keyboard (arrow keys). The selected area of the RVAD map can then be enlarged and/or manipulated.

The selected area would then define the passenger database query, with the control program using the locations within the selected for the host database selection criteria. The host computer would then respond with the attributes or records associated with the selected locations, and display the first few text fields on the screen. The passenger can then select a record to fully display on the screen.

The RVAD can be implemented utilizing a vector and MVP card. An MVP card is a processor device which is capable of rasterizing images on a filing recorder at 2000 or 4000 lines of resolution. It is to be noted that the implementation of an RVAD based system can utilize "off-the-shelf" software such as CAD overlay ESP (Edit, Save, Plot) and DRATFIX CAD Overlay, a program which allows a raster image to serve as a template on the screen so that vector data can be traced over it. It is to be noted that terminal emulators such as the EM320, 4010, and 4105 manufactured by Diversified Computer Systems are particularly suited for RVAD applications.

An important aspect of the present invention is the provision of a mechanism which facilitates the practical pre-storage of preselected presentation format (component(s)) which may be shown on terminals, displays or other output devices associated with seat situated presentation means but which cannot themselves generate such output in real time operation. For example, three dimensional animated graphical presentation outputs incorporating "walk throughs" and "fly-bys" generated using, for example, a 386 or 486 host, cannot be generated within a practical (time frame 48 hours) environment by a local station operating with a 286 AT processor. Such output presentations can be usually qenerated at a particularly slow rate using a 386/486 Host. However, a pre-defined defined, preprocessed, appropriately re-formatted (e.g. for the 16 bit 286 AT processor) and stored in local GRDB in toto to be merely displayed (presented) at the passenger (e.g. AT)

station can provide a practical real time "preprocessed query answer" (PQA) component with real time and/or zoom features (for a passenger workstation presentation). An example of a useful combination would be to use AutoCAD (from Autodesk) to create a CAD model, which is photorealistically rendered using Renderman (from Pixar) or Radiant (from Lazerus) to produce animation output in a playback ready package form. Playback of processed frames is presently available using frame buffer switching type programs such as AutoFLIX or Animator (from Autodesk).

Pregenerated PQA's can be stored as interactive recombinable components, preferably for (an) 8086, 8088, 80286 or higher power local workstation and/or at least a dual window graphic multiprocessed output which can be stored in toto for searchable redisplay upon command in a database of relatively lower (end-user) power (end-user) local workstation, such as an IBM, PC, XT, AT, a low-end 386 based compatible and/or a comparable Motorola 6800 microprocessor chip (LPV) based unit with adequate local database storage capacity and retrieval gate speed. In general, the storing and/or retrieval of single and/or at least dual-window PQA's, particularly involving animation (e.g. including zoom) and/or color is a particularly important efficiency improving feature of this invention (e.g. using an IBM XT, AT, OS2 or compatible).

In designing PQA's, limited (e.g. Menu) choices are preferably presented for query selection to passengers thus increasing the use-probability of said PQA's and thereby the PQA utilization efficiencies of the system. Using a relational database engine such as Ingres with SCO Open Desktop, a user interface is constructed from pre-defined forms such as SQLWindows produced by Gupta Technologies. This form would be used to Query the database (Query by Example), and for display of the extracted information.

Pre-Designing the form is typical of RDBMS applications, and a typical application would be designed with indexes on specific fields of the database tables to assure sub second (or 1-5 second) response times for the application. This would be possible in part to the fact that we are extracting in most cases, when using conventional dialable phone line query limitation data only, not working in a transaction based environment (such as an airline) where data would be entered as well as extracted. The use of PQA's will facilitate the indexing of output formats such that outputs can be standardized regardless of the written and/or spoken language (or its local versions) of the user, (e.g. Chinese, Japanese, Spanish, English, German, Slavic or French). This has also applicability in higher transmission rate capability host/server connection applications within the invention (such as financial and travel service). A preferred system would provide intelligent PQA's capability (as a preferred upgrade option) for any portable unit from related LAN's upon hook-up in any other regional (e.g. diversified continent based WAN in English further in at least one more regionally dominant language and/or a local language. Such service, can be provided from regional "super" hosts and would be available as a location limited upgrade option to selected minimum 386 power workstation's.

Designing the workstation/PC application to take advantage of background processing using Windows or UNIX based software will improve the functionality of the application by supporting concurrent display of data to the end user while processing the transfer of graphic images into a disk or memory buffer. This enhanced capability would require that the PC be configured with two to sixteen megabytes of RAM to take advantage of background processing capabilities of Windows and other multitasking or background processing software. An alternative for enhanced local service would incorporate networked PC's through local UNIX hosts using a Network File System (NFS) and would allow the PC's to transparently use a unified integratable database. The NFS allows many PC's to share a large, common database located on a more powerful host system, thus speeding access and local capacity for data. The invention thus provides improved and expanded graphical and combined presentation capabilities within a time constrained (i.e. on line, overnight, 48 hour service) environment. The PQA system according to the invention by using the combination of a W/S query, a high capacity PQA host associated with a relatively large (and preferably pre-processable) database for at least the most desired or probably anticipated query answer components and menus of getting the PQA's from the host to the W/S within the practically set operational (technical) standards. An example of such a sequence of PQA's can be separate short, walk through segments of PQA's for several house models not yet built and stored in combination with changing other descriptive, financial and related community cultural, educational, financial, shopping, taxing and/or traffic pattern information for a large new development. The updatable marketing information segment is advantageous by being recombinable with the WORM graphics.

Figure 2:
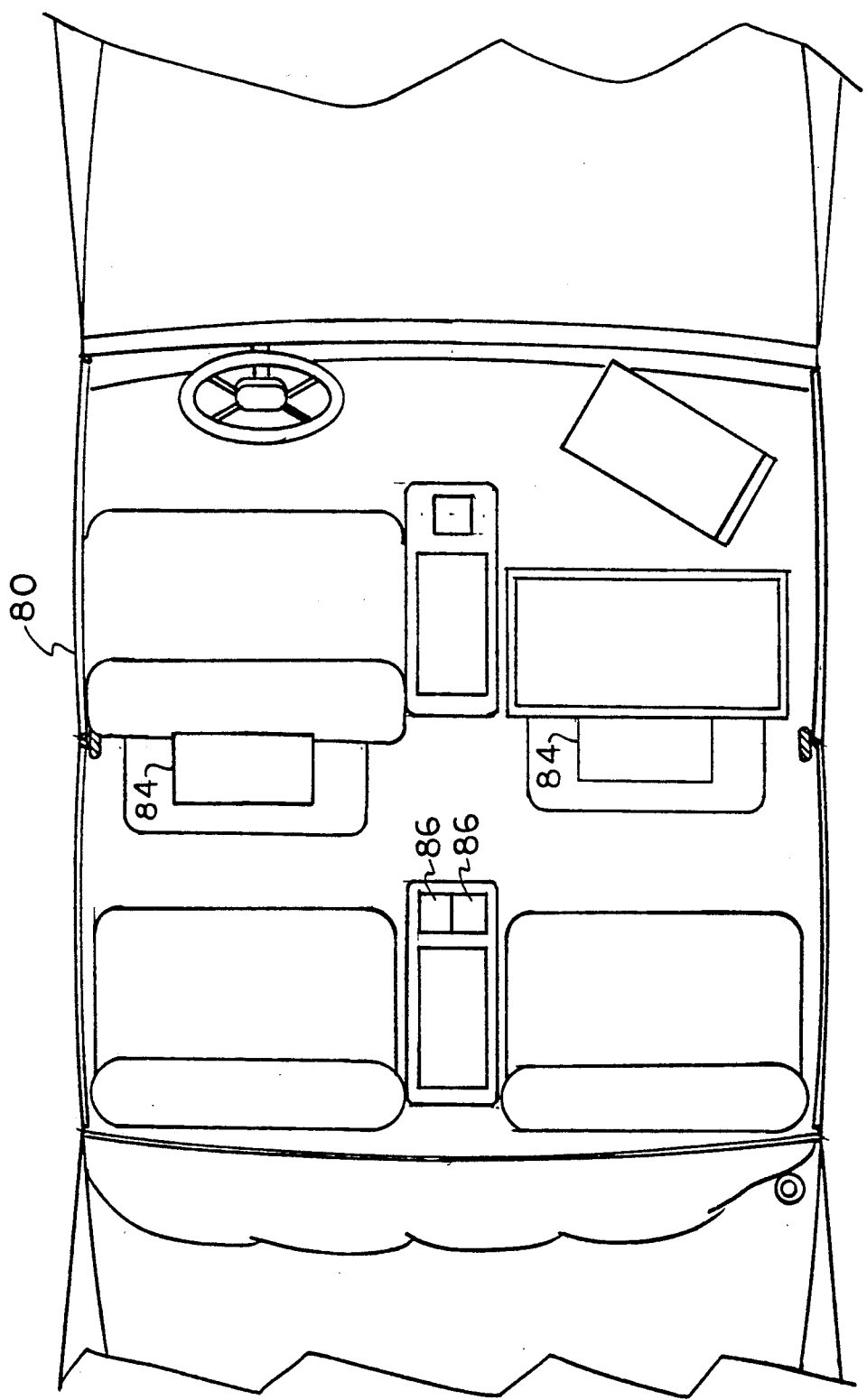
FIG. 2 represents a mobile distributed graphical database system for us in an automobile.
Figure 13:
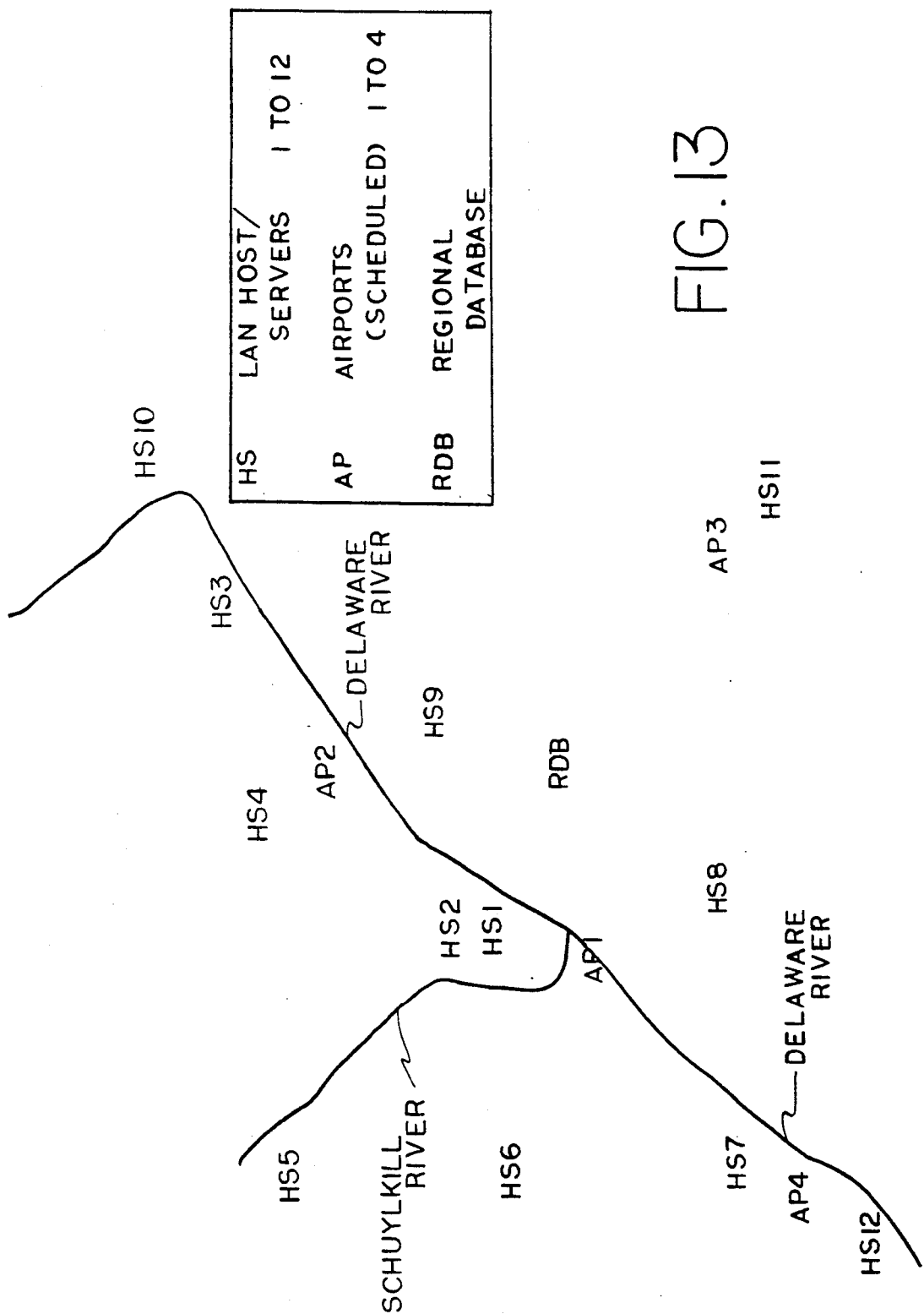
FIG. 13 illustrates a ground based updatable and upgradable mobile distributed database system.

Referring to FIG. 2, the present invention is also applicable to a ground transport system in which the system of the present invention could be placed in an automobile 80. The automobile would include a central computer 82 such as a Compaq System Pro or other computer system operating at least 33 Megahertz, 8 million instructions per second, and having a 4RISC CPU. The vehicle further includes two portable workstations 84 located in the back of the car. The workstations will typically be accessed through a keyboard or mouse with mouse pad. The system disclosed in this figure is suited for PQA generation. As shown in FIG. 13, the system of this embodiment can be utilized for mobile system update. Pre-processed queries can be formulated en route to one of several airports within a region such as the Delaware Valley REgion surrounding Philadelphia. In this example, the system could be used to transport a portion of a database from Wilmington to Philadelphia, which PQA's are formulated and prestored. Service personnel within the vehicle can process PQA for clients departing from the Philadelphia International Airport. The mobile network of the present invention can be utilized in the context of an international and global network.

Figures 14, 14A:
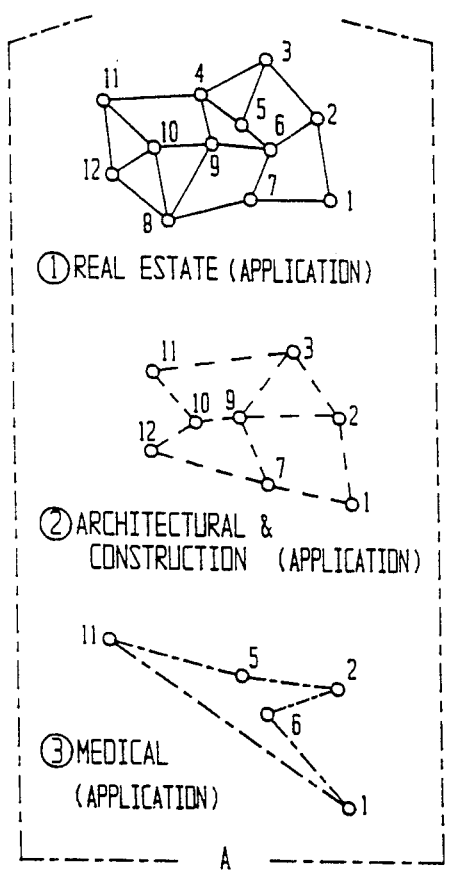
FIGS. 14 and 14A illustrate a neural network as applied in the present invention.
Figure 15:
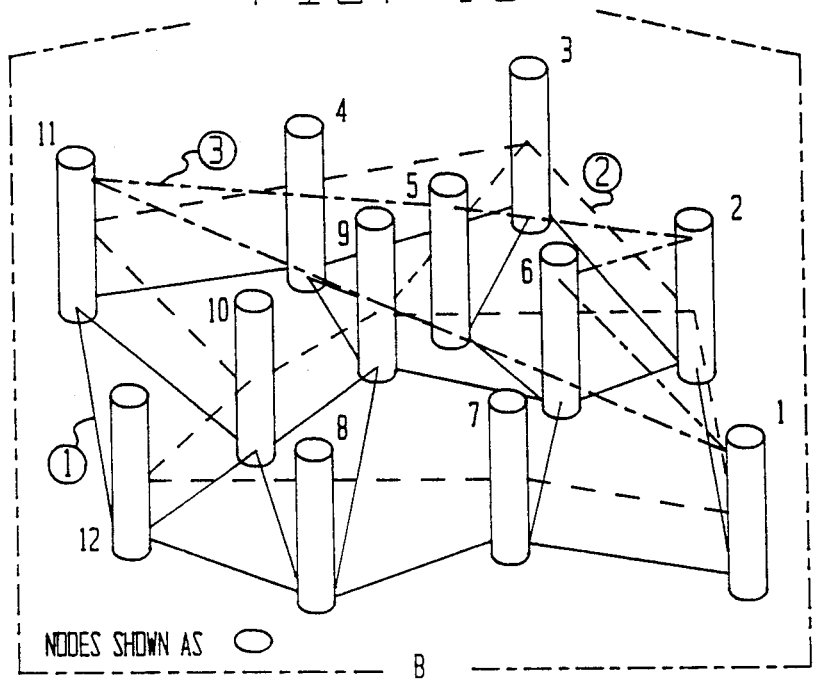
FIGS. 15 and 15A illustrate a neural network matrix system as applied in the present invention.
Figure 15A:
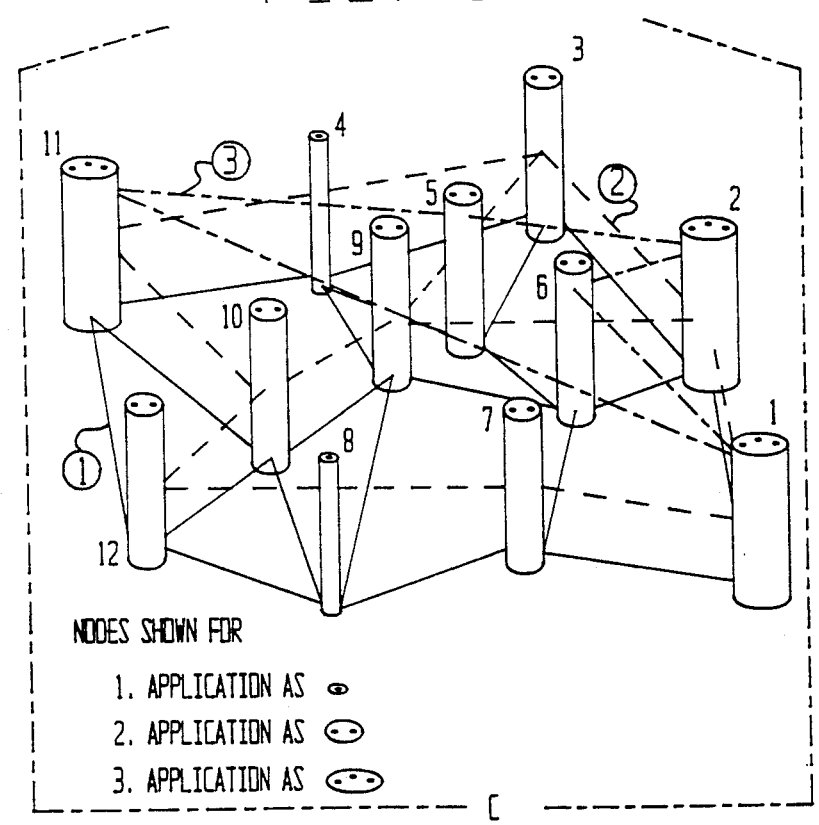

A final aspect of the present invention is the incorporation of the present invention in the context of a neural network and neural matrix. The neural network can comprise both mobile and stationary elements and can be accessible by plane through modem 16. The system provides a means for receiving all related information in a practical manner within time limited provisions using database transfer, storage, and/or transmission means. Presently available computers operate at speeds of approximately 100-150 MIPS. A neural network facilitates network connection from various locations on the network and further facilitates the interconnection between various points in a network. FIGS. 14, 14A and 15, 15A illustrate a neural three layer matrix for real estate, architectural and construction and medical applications which can be applied in the mobile system of the present invention. The system disclosed illustrates how nodes contained within the system can be utilized to facilitate multi-application use. As shown in the graph of FIG. 14A, various of the nodes share different applications. For example, node 1, which in the present invention may be situated on board a plane or in a vehicle such as that shown in FIG. 2, can facilitate the Real Estate, Medical and Architectural & Construction applications. Node 9, by contrast, supports only the Real Estate and Architectural & Construction applications. The neural matrix facilitates database accessibility and updatability from any location within the system. FIGS. 15 and 15A illustrate the neural networks of FIGS. 14 and 14A. Each node is represented as a three dimensional post. Referring to FIG. 15A, the number of applications supported by each node is represented as a dot. In operation, then, a passenger who is part of a system connected to node 1 (which would represent his plane or vehicle), could simultaneously access the Real Estate, Architectural, and Medical applications.

It is to be further appreciated that other embodiments fall within the spirit and scope of the present invention and that the true nature and scope of the present invention is to be determined with reference to the claims appended hereto.

What is claimed is:

1. A method for controlling the transmission and retrieval of tabular and graphical data in a mobile system as recited in the followed steps;
    selecting a presentation option from a station located on the mobile system;
    transmitting said selected presentation option to a host processor located on the mobile system;
    selecting a graphical and tabular data command using said host processor responsive to said transmitted selected presentation option;
    transmitting said responsive graphical and tabular data command from said host processor to said local station on said mobile system;
    selecting a graphical presentation from a responsive to said graphical and tabular data command; and
    displaying said selected graphical presentation on a display associated with said station located on said mobile system.

2. The method of claim 1 comprising the additional steps of selecting tabular data responsive to said graphical and tabular data command and displaying said tabular data on said display.

3. The method of claim 1 wherein said station is a terminal.

4. The method of claim 1 wherein said local station is a lap top computer.

5. The method of claim 1 wherein said local station includes a memory card database storage means.

6. The method of claim 1 wherein said local station is a notebook PC computer.

7. The method of claim 1 wherein said mobile system is a plane.

8. The method of claim 1 wherein said mobile system is stored on an automobile.

9. The method of claim 1 wherein said mobile system is a train.

10. A method for controlling the transmission and retrieval of tabular and graphical data in a mobile system as recited in the following steps;
    selecting a presentation option from a station located on (said) mobile station;
    transmitting said selected presentation option to a host processor located on said mobile station;
    selecting a graphical and tabular data command and associated data using said host processor responsive to said selected presentation option;
    transmitting said responsive graphical and tabular data command and said associated data from said host processor to said mobile station;
    selecting a graphical presentation from a stored database responsive to said graphical and tabular data command; and
    displaying said selected graphical presentation on a display associated with said mobile station.

11. Apparatus for controlling the storing and retrieval of graphical and tabular data on a mobile system comprising:
    station means located on a mobile system, said station means having display means, said station means further having access to a program containing a plurality of presentation components, said station means still further containing graphical user interface means for processing graphical data for display means;
    selection means in communication with said station to select a particular presentation component to be transmitted to a first host processor means located on said mobile system;
    transmission means for transmitting said selected presentation component to said first host processor means, said first host processor means containing a control program for selecting graphical relational database and tabular database commands which match said selected presentation component, said host process means transmitting said commands to said station means wherein said commands are displayed on said graphical user interface; and
    graphical relationship database means for storing graphical data and for transmitting graphical data responsive to said command directly to said display means in response to a command from said graphical user interface (GUI).

12. The apparatus of claim 11 wherein said local station further contains a control program which selects a graphical relational database and tabular database command based upon a selected presentation option.

13. The apparatus of claim 11 further comprising means for updating or extending said graphical relational database.

14. Apparatus of claim 11 further comprising second host computer means in communications with said station and first host computer means, said second host computer being in a remote location from said mobile station and said first host computer means, said second host computer means having a control program which selects a graphical relational database and tabular database command which matches a presentation option transmitted from either said local station or first host computer means, said second host computer means transmitting said graphical relational and tabular database command to said first host computer means or said local station means.

15. The apparatus of claim 14 wherein said second host computer means is situated on a second mobile system.

16. Apparatus for storing and retrieving graphical and tabular data on a mobile station comprising:

mobile computer means located on said mobile station, said mobile computer means having display means and storing a program containing a plurality of presentation options, said local computer further containing a graphical user interface (GUI) program and a first control program for processing a presentation option and for creating a first graphical relational database and tabular database command;

presentation selection means in communication with said program containing said presentation options for selecting a particular option to be processed by a first control program or to be transmitted to host computer means located on said mobile station;

means for transmitting said selected option to said host computer means, said host computer means containing a control program which selects second graphical relational database and tabular database command which matches said selected presentation option, said host computer means transmitting said database command to said mobile computer means wherein said command is displayed on said display means of said mobile computer means by said graphical user interface; and graphical relational database means for storing graphical data and for transmitting graphical data responsive to said first or second command directly to said display means in response to a third command from said graphical user interface program.

17. The apparatus of claim 16 wherein said presentation selection means comprises a keyboard.

18. The apparatus of claim 16 wherein said presentation selection means comprises a mouse.

19. The apparatus of claim 16 wherein said graphical relationship database comprises write once read many (WORM) means.

20. The apparatus of claim 16 wherein said transmission means utilizes a broad band transmission system.

21. The apparatus of claim 16 wherein said presentation option is transmitted at a rate of around 10,000 baud or less.

22. The apparatus of claim 16 wherein said apparatus is compatible with transportable database storage means having a storage capacity of at least 100 megabytes.

23. The apparatus of claim 16 further comprising at least one transportable database means.

24. The apparatus of claim 23 wherein said transportable database means is a compact disk read-only memory (CD-ROM).

25. The apparatus of claim 16 wherein said apparatus is connectable to a neural network.

26. The apparatus of claim 16 wherein said apparatus is connectable to a neural matrix.

* * * * *